United States Patent
Yonar et al.

(10) Patent No.: US 11,095,487 B1
(45) Date of Patent: Aug. 17, 2021

(54) OPERATING A WIRELINE RECEIVER WITH A TUNABLE TIMING CHARACTERISTIC

(71) Applicant: INTERNATIONAL BUSINESS MACHINES CORPORATION, Armonk, NY (US)

(72) Inventors: Abdullah Serdar Yonar, Zurich (CH); Pier Andrea Francese, Adliswil (CH); Marcel A. Kossel, Reichenburg (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/850,084

(22) Filed: Apr. 16, 2020

(51) Int. Cl.
*H04B 1/16* (2006.01)
*H04L 25/03* (2006.01)

(52) U.S. Cl.
CPC ......... *H04L 25/03949* (2013.01); *H04B 1/16* (2013.01); *H04L 25/03834* (2013.01)

(58) Field of Classification Search
CPC ........ H04L 25/03949; H04L 25/03834; H04B 10/524; H04B 1/123
See application file for complete search history.

(56) References Cited

U.S. PATENT DOCUMENTS

| | | | |
|---|---|---|---|
| 7,539,243 B1 | 5/2009 | Toifl | |
| 8,446,942 B2 | 5/2013 | Hasegawa | |
| 8,743,944 B2 | 6/2014 | Sunaga | |
| 8,923,380 B1* | 12/2014 | Malhotra | .......... H04L 25/03057 375/232 |
| 8,982,941 B2 | 3/2015 | Chmelar | |
| 9,800,438 B1* | 10/2017 | Zhang | .................... H04L 7/0087 |
| 10,205,525 B1* | 2/2019 | Cevrero | ........... H04B 10/50593 |
| 2010/0246722 A1* | 9/2010 | Campeau | .............. H04L 25/063 375/319 |
| 2015/0085912 A1* | 3/2015 | Cho | .................. H04L 25/03885 375/232 |
| 2018/0248577 A1* | 8/2018 | Hossain | .................. H04L 27/01 |
| 2018/0262373 A1* | 9/2018 | Shibasaki | .......... H04B 10/6933 |

(Continued)

FOREIGN PATENT DOCUMENTS

WO 2009113462 A1 9/2009

OTHER PUBLICATIONS

Ashkan Roshan-Zamir, Takayuki Iwai, Yang-Hang Fan, Ankur Kumar, Hae-Woong Yang, Lee Sledjeski, John Hamilton, Soumya Chandramouli, Arlo Aude and Samuel Palermo, "A 56-Gb/s PAM4 Receiver With Low-Overhead Techniques for Threshold and Edge-Based DFE FIR- and IIR-Tap Adaptation in 65-nm CMOS," Mar. 2019 (Year: 2019).*

(Continued)

*Primary Examiner* — Aristocratis Fotakis
(74) *Attorney, Agent, or Firm* — Ewa M. Wozniak (57) ABSTRACT

A method of operating a wireline receiver. The receiver may include a front-end comparator and a feedback controller. The method may include providing, by the front-end comparator, a symbol signal by processing a received electrical input signal according to a tunable timing characteristic of the front-end comparator. The method may further include adapting, by the feedback controller, the processing of the input signal to match a predetermined processing criterion by tuning the timing characteristic based on the symbol signal.

20 Claims, 5 Drawing Sheets

(56) References Cited

U.S. PATENT DOCUMENTS

2019/0173586 A1* 6/2019 Cevrero ............ H04B 10/5055

OTHER PUBLICATIONS

Khosrov D. Sadeghipour, Paul D. Townsend and Peter Ossieur, Design of a Sample-and-Hold Analog Front End for a 56Gb/s PAM-4 Receiver Using 65nm CMOS, IEEE, May 24-27, 2015 (Year: 2015).*

Shiva Kiran, Shengchang Cai, Ying Luo, Sebastian Hoyos and Samuel Palermo, A 52-GB/s ADC-Based PAM-4 Receiver With Comparator-Assisted 2-bit/Stage SAR ADC and Partially Unrolled DFE in 65-nm CMOS, IEEE Journal of Solid-State Circuits, vol. 54, No. 3, Mar. 2019 (Year: 2019).*

Cevrero etal., "A 100Gb/s 1.1pJ/b PAM-4 RX with Dual-Mode 1-Tap PAM-4 / 3-Tap NRZ Speculative DFE in 14nm CMOS FinFET", ISSCC 2019 / Session 6 / Ultra-High-Speed Wireline / 6.1, 2019 IEEE International Solid-State Circuits Conference, ISSCC 2019/ Feb. 18, 2019, 3 pages.

Chandramouli, "A Novel Analog Decision-Feedback Equalizer in CMOS for Serial 10-GB/SEC Data Transmission Systems", School of Electrical and Computer Engineering, Georgia Institute of Technology, Dec. 2007, 130 pages.

Jeeradit et al., "Characterizing Sampling Aperture of Clocked Comparators", 2008 Symposium on VLSI Circuits Digest of Technical Papers, © 2008 IEEE, 2 pages.

Shibasaki et al., "A 56Gb/s NRZ-Electrical 247mW/lane Serial-Link Transceiver in 28nm CMOS", ISSCC 2016 / Session 3 / Ultra-High-Speed Transceivers / 3.5, 2016 IEEE International Solid-State Circuits Conference, ISSCC 2016 / Feb. 1, 2016, 3 pages.

Shibasaki et al., "A 56-Gb/s Receiver Front-End with a CTLE and 1-Tap DFE in 20-nm CMOS", 2014 Symposium on VLSI Circuits Digest of Technical Papers, © 2014 IEEE, 2 pages.

* cited by examiner

OPERATING A WIRELINE RECEIVER WITH A TUNABLE TIMING CHARACTERISTIC

BACKGROUND

The present invention relates to wireline receivers with an analog front end and ways of operating such wireline receivers.

The need for higher data rates in wireline communications has led to the emergence of higher-order modulation techniques such as 4-level Pulse Amplitude Modulation (PAM-4) to respond to the requirement of higher bandwidth efficiency. As a result, the design of wireline receivers has become more complex and energy-consuming. In order to increase the power efficiency of the receiver, an analog architecture can be opted instead of approaches involving an analog-to-digital converter (ADC) with a digital signal processor (DSP). In order to equalize the channel response, speculative decision feedback equalizers (DFEs) have become common in analog architectures for high speed applications. However, this increases the number of front-end comparators considerably.

In an architecture like this, decreasing the number of front-end comparators may bring significant improvements in terms of power efficiency, since receiver power consumption scales with the number of front-end comparators. A reduced number of front-end comparators can yield several effects that independently result in a higher power efficiency. The load of the analog front end may decrease, thus reducing the power consumption of the analog front end. Since each front-end comparator has to be clocked, the clock load may decrease, reducing the needed amount of clock buffering and the power consumed by the clock network. The power consumption for data slicing may also be reduced.

One way to reduce the number of the front-end comparators is to shape the transmitted data pulses such that the value of the first post cursor ($h_1$) is half the value of the main cursor ($h_0$), which is called 1+0.5D pulse shaping. 1+0.5D pulse shaping may cause some of the threshold levels for resolving speculative DFE to overlap, so each group of overlapping levels may be decided by the same front-end comparator, thus reducing the number of front-end comparators and the power consumption. In the example of a PAM-4 receiver supporting 1+0.5D pulse shaping, 4 out of 12 speculative decisions may overlap, which is a reduction in front-end comparator number by one third.

SUMMARY

According to an embodiment of the present invention, a method of operating a wireline receiver is provided. The receiver may include a front-end comparator and a feedback controller. The method may include providing, by the front-end comparator, a symbol signal by processing a received electrical input signal according to a tunable timing characteristic of the front-end comparator, The method may further include adapting, by the feedback controller, the processing of the input signal to match a predetermined processing criterion by tuning the timing characteristic based on the symbol signal.

According to another embodiment of the present invention, a wireline receiver comprising a front-end comparator and a feedback controller is provided. The front-end comparator may be configured to provide a symbol signal by processing a received electrical input signal according to a tunable timing characteristic of the front-end comparator. The feedback controller may be configured to adapt the processing of the input signal to match a predetermined processing criterion by tuning the timing characteristic based on the symbol signal.

Embodiments of the invention are given in the dependent claims. Embodiments of the present invention can be freely combined with each other if they are not mutually exclusive.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Pulse shaping, i.e., changing the waveform of transmitted pulses, is a technique that is occasionally applied in wireline communications to optimize a transmitted signal better for transfer across a known communication channel or subsequent processing. For instance, pulse shaping can be applied to improve control over intersymbol interference (ISI) that may be caused by the channel.

In a wireline communications system, pulse shaping is typically done using a feed-forward equalizer (FFE) at the transmitter, and a continuous-time linear equalizer (CTLE) at the receiver. Pulse shaping at the transmitter side, using FFE, requires a backchannel to communicate the pulse data from receiver back to transmitter. For this reason, care must be taken to ensure interoperability between a given pair of receiver and transmitter by implementing support for communication via a back channel. Providing a back channel also increases the total pin count of the communication hardware. The CTLE, at the receiver side, is a critical analog block that runs at full rate. Equipping a CTLE with a sufficient range of tunability to enable support for pulse shaping usually has an effect on its performance. In addition, calibration of the CTLE has to be carried out in continuous time at full rate, and the consumption of power and space is increased.

Embodiments of the present invention may provide for a simpler and more efficient approach for implementing pulse shaping in a wireline communications system.

Especially in high-speed applications, many wireline receivers are equipped with an analog front end. Such analog front ends typically use front-end comparators as the first stage capable of interpreting the input signal in terms of its information content. For the sake of distinction, these front-end comparators will be referred to herein as front-end comparators. A front-end comparator may implement a two-stage design comprising an interpreting stage (e.g., an integrating amplifier) that is adapted for detecting a symbol in the input signal and a hold stage (e.g., a latch or a flip-flop) that allows for regenerating the output of the first stage and holding a transitory symbol that is output by the interpreting stage.

The disclosed method of operating a wireline receiver may include the step of providing a symbol signal by processing a received electrical input signal according to a tunable timing characteristic of the front-end comparator. The electrical circuitry of the front-end comparator may process the incoming input signal and output a symbol signal that depends on the input signal's amplitude and its variation in time. In total, the generation of the symbol signal can be considered as the result of a deciding or determining process.

The step of adapting the processing of the input signal requires a feedback controller as well as a front-end comparator with a tunable timing characteristic. A timing characteristic of a front-end comparator may be any property of the front-end comparator that influences the way how the front-end comparator processes the input signal temporally. Without limitation, the timing characteristic may include a physical or logical quantity, a parameter and/or a mathematical function, and more particularly, an impulse sensitivity function, a time constant of integration, a sampling time, and/or a sampling rate.

A front-end comparator with a tunable timing characteristic may be implemented with a comparably low increase of design complexity by extending an existing design with electrical circuitry that allows for tuning said property of the front-end comparator. For example, a voltage-controlled or programmable device may be coupled to the circuitry of the front-end comparator such that an electrical resistance or conductivity, a capacitance or an inductance may be varied according to the applied voltage or programming state of such device. In another example, an existing or dedicated digital controller of the receiver may be used to set the state of a digital-to-analog converter (DAC) to implement the required tunability by means of a digital tuning signal.

The tuning signal or control signal that is input to the front-end comparator in order to use the tunability of its timing characteristic is provided as an output of a feedback controller. The feedback controller may be a digital or analog device that is configured for receiving the symbol signal (directly or in a processed form) that is output by the front-end comparator, and in response, providing the control signal to a tuning input of the front-end comparator, wherein the control signal may be chosen or generated suitably to fulfill the predetermined processing criterion. The feedback controller may be an existing device that may be modified or reprogrammed to implement said front-end comparator tuning functionality, or a dedicated device may be installed if an improved decoupling from the signal processing activity of other devices within the receiver is desired.

The receiver may include multiple front-end comparators that may decode input signals that are received via different channels. In this case, a single feedback controller may be provided for controlling the entire set of front-end comparators in parallel, or a dedicated feedback controller may be provided in each channel if an improved decoupling of the channels is desired.

Taking advantage of a receiver with a front-end comparator having a tunable timing characteristic and with a feedback controller adapted for tuning said tunable timing characteristic, the proposed method of operating a wireline receiver may be implemented using the wireline receiver disclosed herein. As the desired influence on the input signal, as defined by the processing criterion, is both generated and used inside the receiver, the wireline receiver and the method may advantageously eliminate the need for a back channel that would otherwise be required to influence the input signal in the desired manner on the transmitter side. According to embodiments, the processing of the input signal may rather be adapted purely at the receiver, as will be explained in more detail below. For instance, a pulse-shaping technique may be implemented to eliminate intersymbol interference (ISI). In another example, the sampling time may be adjusted if the front-end comparator is used for phase detection.

The processing criterion may be defined in terms of a quantity or property that can be measured or captured from the symbol signal or its respective derivative downstream the front-end comparator. A relation between a degree of deviation of the symbol signal from the requirements of the processing criterion does not necessarily have to be established to implement a successful control of the tunable timing characteristic, as the closed feedback loop between feedback controller and front-end comparator may allow for an iterative convergence. However, the possibility of determining such relation is not excluded and may be useful to obtain a faster convergence. Depending on the nature of the feedback controller, its position and, if applicable, its further functionality in the circuitry of the receiver, the processing criterion may be implemented as hardware or software.

The receiver may be implemented in any known or future technology suitable for realizing electronic circuits, including, but not limited to, integrated circuits formed on microchips such as CMOS chips.

A preferable choice for implementing wireline communication in the context of the disclosed method may be the use of a pulsed signal as the input signal. Without limitation, the impulse sensitivity function (ISF) may be chosen as the tunable timing characteristic if the input signal is pulsed. The ISF is closely related to the front-end comparator's signal aperture and time constant of integration. However, it may also be possible to implement the method with a setup that is configured for transmission of a non-pulsed input signal, where the timing criterion may relate, for example, to a slew rate of the input signal.

According to an embodiment, the timing characteristic may include an impulse sensitivity function of the front-end comparator, the processing criterion may include a desired shape of the input signal, and the adaptation of the processing may include emulating a deformation of the input signal to match the desired shape by adjusting the impulse sensitivity function. The impulse sensitivity function (ISF) records the change of sensitivity of the front-end comparator in time. It may be influenced, e.g., in its shape, width (the sampling aperture), and position in a similar manner as one may do for tuning an oscillator circuit, e.g., by introducing a variation of a capacitance, an inductance, or a delay. By tuning the ISF, the temporal distribution of weight factors in the weighted integration performed by the front-end comparator may be changed, which may have a similar effect on the symbol signal thus determined as may be the case if the input signal had been distorted instead.

Hence, the tuned front-end comparator may simulate a desired shape of the input signal, as it may be useful, without limitation, to compensate intersymbol interference caused by the transfer of the input signal, or to emulate a desired property of the input signal such as a 1+0.5D form where the amplitude of the first post-cursor sampled from the input signal is half the amplitude of the main cursor immediately preceding the first post-cursor.

According to an embodiment, the front-end comparator may include an integrating amplifier stage and a tunable capacitance electrically connected in parallel with an output of the integrating amplifier stage. The adjustment of the impulse sensitivity function may include setting the tunable capacitance. The front-end comparator may include an integrating amplifier stage. The integrating amplifier stage may include a tail current source including a field-effect transistor having a tunable channel size. The adjustment of the impulse sensitivity function may include setting the tunable channel size.

According to an embodiment, the front-end comparator may include a first stage and a tunable capacitance electrically connected in parallel with an output of the first stage. The feedback controller may be configured for performing the tuning of the timing characteristic by setting the tunable capacitance. The front-end comparator may include a first stage. The first stage may include a tail current source. The tail current source may include a field-effect transistor having a tunable channel size. The feedback controller may be configured for performing the tuning of the timing characteristic by setting the tunable channel size.

This may allow for tuning the impulse sensitivity function (ISF) of the front-end comparator. The usage of a tunable capacitance may minimize the flow of electrical current needed to tune the front-end comparator. Without limitation, a typical first stage of a front-end comparator may be an integrating amplifier, whose output may be handed as an input to a latch or flip-flop on a second or higher stage to store the symbol signal that is output by the first stage. Furthermore, a tunable capacitor may be added later to the first stage of an existing front-end comparator design, which may avoid an increase of design complexity.

It should be noted that the tunable capacitance is logically assigned herein to the front-end comparator, but may be implemented as a separate device that is added at a later time to an existing front-end comparator with two or more stages.

The modified front-end comparator may also provide an enhanced noise performance since the effective gain may increase with integration time. Simulation results show that minimum capacitance configuration may have an input referred noise value of 2.32 mV rms while maximum capacitance configuration may have 2.07 mV rms. On the other hand, a front-end comparator without capacitive ISF modification may have 3.09 mV rms input referred noise voltage.

Moreover, as front-end comparator specifications regarding the aperture time show a tendency of becoming tighter with the need for higher data rates, the approach of capacitive tuning may relax this trend as the front-end comparator may be allowed to integrate an earlier portion of the input signal.

Additionally or alternatively, the ISF of the front-end comparator may be influenced using a tunable field-effect transistor, such as an n-channel metal-oxide-semiconductor field-effect transistors (NMOS FET) with a tunable channel size, in the tail current source of the stage. Here, the timing of weighted integration performed by the front-end comparator may be adjusted by setting the channel size, which may control the conductivity of the transistor, i.e., the transistor may be used as a tunable resistor. In this way, the integration process of the input signal may be adjusted by controlling the current provided for performing the integration using, e.g., the control signal provided by the feedback controller.

Overall, independent resistive and capacitive tuning of the ISF may be implemented by providing the first stage both with tunable output capacitances and tunable tail current source transistors. This may provide two independent degrees of freedom for reshaping the ISF, enabling a more flexible and precise control of the integration process.

According to an embodiment, the receipt of the input signal includes recording a main cursor of the input signal and recording a first post-cursor of the input signal immediately after recording the main cursor. The desired shape requiring that the amplitude of the first post-cursor is one half times the amplitude of the main cursor. This corresponds to the so-called 1+0.5D pulse shaping, which may cause decision threshold levels of front-end comparators assigned to different previous-symbol values to overlap. For each overlapping pair of decision levels, the decision for both interacting previous-symbol values may be performed by the same front-end comparator. Hence, 1+0.5D pulse shaping may reduce number of front-end comparators. This may contribute to an increase in energy efficiency of the wireline receiver, both directly as each saved front-end comparator may consume no power and indirectly as the load on clock circuitry may be reduced. The described approach may enable a simple implementation of 1+0.5D pulse shaping that may be effective yet without increasing the design overhead.

According to an embodiment, the method further includes performing an initial calibration of the front-end comparator. The initial calibration includes repeatedly receiving, by the front-end comparator, a calibration input signal encoding a predetermined calibration symbol. The method includes determining, by the feedback controller, a transition timing characteristic by varying the timing characteristic for each repetition of the calibration input signal until the symbol signal of a given repetition differs from the symbol signal of the repetition immediately preceding the given repetition. The method includes setting, by the feedback controller, the timing characteristic to the transition timing characteristic.

This may provide a simple way of performing an initial calibration, e.g., after completion of the manufacturing of the wireline receiver but before starting regular operation. The initial setting thus determined for the tuning of the timing characteristic may be stored in a non-transitory memory on board of the wireline receiver. After powering off and restarting, the wireline receiver may then reset the front-end comparator tuning to the stored initial tuning setting. This may reduce the time needed to recalibrate the front-end comparator "from scratch" after power off, which may occur otherwise if the determined initial calibration setting is far from a zero point of tuning which can be assumed to be initialized if no stored initial calibration is present.

According to an embodiment, the timing characteristic includes a sampling time of the front-end comparator, the processing criterion includes a desired phase accuracy, and the adaptation of the processing includes adjusting the sampling time to match the desired phase accuracy. This approach may be applicable to cases where the front-end comparator is used for decoding the input signal by means of phase-detection rather than weighted integration as described above for the case of an integrating amplifier. In this scenario, the front-end comparator may typically be coupled to a clock-and-data recovery (CDR) circuit rather than a pure clock oscillator. In particular, this approach may be applicable to phase detection by timing recovery as it is known, e.g., from the Mueller-Müller detection scheme. For example, the timing may be set using an appropriate electrical device or circuit that may be coupled, e.g., in parallel to the front-end comparator or one of its stages, including, but not limited to, the approaches using a tunable capacitor described herein. Without limitation, the phase accuracy may be expressed as an interval of tolerable phase angle or time values. In this way, the advantages provided by the internal feedback loop may be made accessible also for wireline receivers with phase-detection front-end comparators implementing timing-based detection.

According to an embodiment, the timing characteristic includes an impulse sensitivity function of the front-end comparator, the processing criterion includes a desired phase accuracy, and the adaptation of the processing includes repositioning a transition level of the front-end comparator for deciding between two bit values of the symbol signal to match the desired phase accuracy by adjusting the impulse sensitivity function. This approach may also be applicable to cases where the front-end comparator is used for decoding the input signal by means of phase-detection. In this scenario, the front-end comparator may typically be coupled to a CDR circuit rather than a pure clock oscillator. In particular, this approach may be applicable to phase detection by edge detection. This approach may allow for choosing the precise transition point between two symbols (e.g., bits) by changing the ISF of the edge comparator. With the help of a pattern filter, the results that correspond to correct phase information may be extracted from the output of the edge comparator. For example, the timing may be set using an appropriate electrical device or circuit that may be coupled, e.g., in parallel to the front-end comparator or one of its stages, including, but not limited to, the approaches using a tunable capacitor described herein. Without limitation, the phase accuracy may be expressed as an interval of tolerable phase angle or time values. In this way, the advantages provided by the internal feedback loop may be made accessible also for wireline receivers with phase-detection front-end comparators implementing edge-based detection.

According to an embodiment, the receiver further includes a calibration comparator having a tunable timing characteristic. The method may further include adjusting, by the feedback controller, the timing characteristic of the calibration comparator to the timing characteristic currently set for the front-end comparator. The tuning of the timing characteristic may be performed with the calibration comparator. The adaptation of the processing may further include reassigning the provision of the symbol signal to the calibration comparator.

According to an embodiment, the receiver further includes a calibration comparator having a tunable timing characteristic, the feedback controller being further configured for adjusting the timing characteristic of the calibration comparator to the timing characteristic currently set for the front-end comparator, the feedback controller being further configured for performing the tuning of the timing characteristic with the calibration comparator and for including in the adaptation of the processing a reassignment of the provision of the symbol signal to the calibration comparator.

Providing an additional calibration comparator may yield an easy way to calibrate a particular front-end comparator during operation. During the provision of the symbol signal by the front-end comparator, the calibration comparator may be tuned to the same timing characteristic as the front-end comparator and may thus process the input signal in an identical manner as the front-end comparator. This may result in an output of a redundant symbol signal by the calibration comparator that may be observed (e.g., using an additional multiplexer) by the feedback controller in order to determine the amount of tuning that may currently be needed, but may be ignored by further stages, units and devices of the receiver while the feedback controller does not initialize a new calibration cycle. If, however, a new calibration cycle is started, the feedback controller may tune the calibration comparator as required and then swap the roles of the front-end comparator and the calibration comparator, i.e., the symbol signal provided by the newly tuned calibration comparator may be received by further stages, units and devices of the receiver for downstream processing of the symbol signal, while the feedback controlled may continue to observe the symbol signal provided by the front-end comparator as a redundant signal to determine whether another tuning action is required.

This approach may improve decoupling between the feedback controller and the front-end comparator as downstream processing and feedback control may use separate symbol signals, which may allow for operating the receiver at higher clock rates and may result in a more failsafe performance of the receiver. The approach may be simplified further if the receiver is equipped with multiple front-end comparators running at below full clock rate (e.g., four front-end comparator running at quarter rate). In this case, the calibration comparator may be tuned to the timing characteristic of one of the front-end comparators and may be observed. If no calibration is needed, e.g. during a predefined time window, the calibration comparator may be tuned to the timing characteristic of another one of the front-end comparators. If a calibration is necessary, the calibration comparator may be retuned and then swapped, e.g., in digital domain, with the front-end comparator currently observed, and the next observation/calibration cycle may be started.

According to an embodiment, the method further includes filtering a predetermined filter symbol from the symbol signal and counting a frequency of a predetermined counting symbol either preceding or following the filter symbol. The method includes the processing criterion including a tolerance interval for the frequency, the adaptation of the processing being triggered if the frequency is outside the tolerance interval. This may provide a simple and effective rule for calibrating the front-end comparators during regular operation.

Without limitation, the symbol signal may be a binary signal encoding, for instance, two bit values "0" and "1", or a four-level signal as implemented by technologies such as PAM-4 and encoding, for instance, four values "−3", "−1", "1" and "3". One of those values may be selected as the filter symbol. When observing a large number of symbols arriving immediately before or after the filter symbol, their statistical distribution may be expected to be approximately equal. For example, if the symbol signal is binary and the filter symbol is "1", then a frequency of about 50% of the symbols arriving after each "1" should be "1" and 50% should be "0". Hence, an observed deviation from such equal distribution may serve as a quantity for controlling the adaptation of the processing. The choice of the tolerance interval may depend on the number of symbols that are continuously counted to obtain the statistics (that may be, without limitation, a "running window" scheme of a constant number of symbols or a varying number of symbols depending on the workload within a predetermined time window), and/or on the variation of deviations from said equal distribution that can be expected for a given application scenario.

According to an embodiment, the receiver is configured for providing the symbol signal in response to receiving the input signal carrying a four-level pulse-amplitude modulation. According to an embodiment, the input signal carries a four-level pulse-amplitude modulation. This may reduce the bandwidth required for transmitting information from a transmitter to the receiver and may increase the amount of information that can be transmitted within a given portion of the input signal.

According to an embodiment, the tunable capacitance includes a capacitive digital-to-analog converter (CDAC). This may allow for tuning the timing characteristic by setting the total capacitance of the CDAC. As a digital-to-analog converter (DAC), the tunable capacitance may be controlled from the digital domain, i.e. using a digital signal output by the feedback controller. The timing characteristic (e.g., the ISF) of the front-end comparator may then be set to one out of a multiplicity of settings that is determined by the resolution of the tuning signal. For example, a 5-bit signal may allow to set the timing characteristic to one out of 32 possible settings. The desired accuracy may then be attained by choosing the required resolution for the DAC.

According to an embodiment, the first stage includes an integrating amplifier. This may provide a basis of flexibility for performing the method under various application conditions. For instance, an integrating amplifier may decide between symbol levels by performing a weighted integration of the input signal, which may allow for performing the method with applications where the input signal is a pulsed signal. However, the method may also be performed with an integrating amplifier as the first stage if the input signal is continuous, in which case a CDR-based phase detection may be implemented using, e.g. Mueller-Müller timing recovery. Other phase-detection approaches may also be possible, such as edge-based phase detection using the architecture as a phase detector.

According to an embodiment, the feedback controller includes a digital block. This may provide the possibility to implement the functions of the feedback controller in the digital domain, including, but not limited to, the capability to control the timing characteristic of the front-end comparator using a digital signal as well as the capability to determine a degree of correction of the timing characteristic if a deviation is detected. A digital block may allow for programming, e.g., logical rules representing the processing criterion with a higher complexity as may be possible using a passive analog device as the feedback controller.

According to an embodiment, the receiver further includes a deserializer electrically connected in series between the front-end comparator and the feedback equalizer. A deserializer may allow for conceiving the receiver as part of a serializer-deserializer (SerDes) setup where the transmitter implements the serializer as counterpart of the deserializer on board of the receiver. This may allow for transmitting multiple parallel channels of information across the channel between transmitter and receiver as a sequence in time. This may reduce the number of parallel channels (lines) for the transmission and, consequentially, the number of I/O pins that need to be provided for implementing said communications link.

According to an embodiment, the front-end comparator is clocked at a rate of less than a full clock rate available in the receiver. In a non-limiting example, the front-end comparator is clocked at one fourth of the full clock rate, i.e., a quarter-rate receiver may be realized. If operating the front-end comparator in parallel with further front-end comparators at a lower rate than the full clock rate may relax specifications regarding the aperture time of the front-end comparator while still supporting a high data rate corresponding to the full clock rate. This may be achieved by allowing the front-end comparator to include an earlier portion of the input signal in the processing. Relaxed timing conditions on the front-end comparator may provide a greater flexibility in operating the receiver. In a non-limiting example, the reduced-rate timing may allow for an easier calibration of the front-end comparator by swapping the output with that of an additional calibration comparator in the digital domain.

Figure 1:
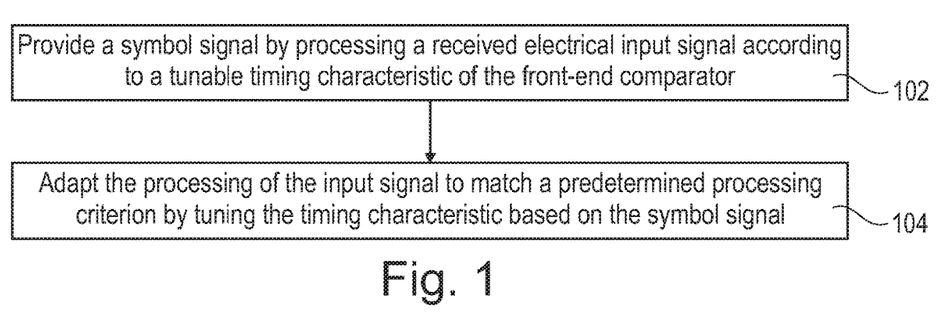
FIG. 1 is a flow diagram representing a method of operating a wireline receiver.

Now turning to the drawings, FIG. 1 is a flow diagram representing an exemplary method of operating a wireline receiver. The method may include a step 102 where a front-end comparator of the receiver responds to the receipt of an electrical input signal by providing a symbol signal at its output. The front-end comparator may determine the symbol signal by processing the input signal according to a tunable timing characteristic of the front-end comparator. The timing characteristic may be any property of the front-end comparator that influences the way how the front-end comparator processes the input signal temporally. Without limitation, the timing characteristic may include a physical or logical quantity, a parameter and/or a mathematical function, and more particularly, an impulse sensitivity function, a time constant of integration, a sampling time, and/or a sampling rate. Without limitation, a tunable timing characteristic may be implemented by extending an existing front-end comparator design with electrical circuitry that allows for tuning the timing characteristic of the front-end comparator. For example, a voltage-controlled or programmable device may be coupled to the circuitry of the front-end comparator such that an electrical quantity (including, but not limited to an electrical resistance or conductivity, a capacitance or an inductance) may be varied according to the applied voltage or programming state of such device. In another example, an existing or dedicated digital controller of the receiver may be used to set the state of a digital-to-analog converter (DAC) to implement the required tunability by means of a digital tuning signal.

The method may include a further step 104 following step 102 where a feedback controller on board of the receiver may receive the symbol signal provided by the front-end comparator, and in response, may cause the front-end comparator to adapt the processing of the input signal by tuning the tunable timing characteristic based on the symbol signal in a way that a predefined processing criterion is fulfilled.

Based on the symbol signal, the feedback controller may detect a mismatch between the symbol signal and a predefined processing criterion. The processing criterion may be defined in terms of a quantity or property that can be measured or captured from the symbol signal or its respective derivative downstream the front-end comparator. A relation between a degree of deviation of the symbol signal from the requirements of the processing criterion does not necessarily have to be established to implement a successful control of the tunable timing characteristic, as the closed feedback loop between feedback controller and front-end comparator may allow for an iterative convergence. However, the possibility of determining such relation is not excluded and may be useful to obtain a faster convergence. Depending on the nature of the feedback controller, its position and, if applicable, its further functionality in the circuitry of the receiver, the processing criterion may be implemented as hardware or software.

If a mismatch is detected, the feedback controller may determine (select, generate) a control signal, or alternatively, may change an existing control signal according the extent of mismatch. The feedback controller may then provide the control signal to a timing control input of the front-end comparator. The front-end comparator may then respond to the presence of the control signal or the change of the present control signal, respectively, by implementing an altered timing characteristic. In this way, the processing of the input signal may be adapted to the predefined processing criterion.

Figure 2:
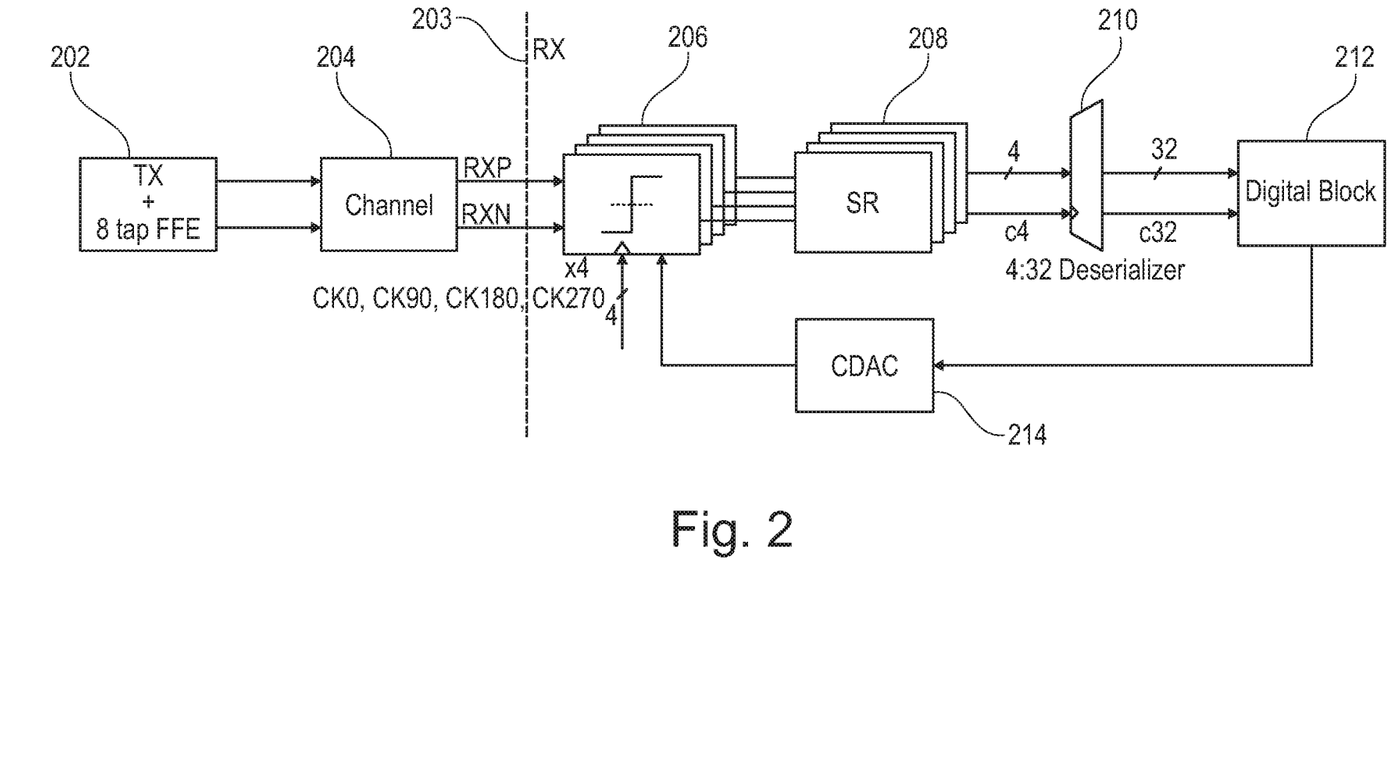
FIG. 2 is a block diagram illustrating signal processing using a wireline receiver.

FIG. 2 is a block diagram illustrating an exemplary environment for processing an input signal using a wireline receiver. The input signal may be transmitted by a transmitter 202 ("TX" in FIG. 2). In the non-limiting example of FIG. 2, the transmitter 202 may incorporate an 8-tap feedforward equalizer ("FFE") that may be used, for instance, to apply a pre-emphasis on the input signal. Optionally, the transmitter 202 may further include a serializer for trading bandwidth against baud rate.

The transmitter 202 may transmit the input signal via a channel 204. The channel 204 may be unidirectional, i.e., the channel 204 may be implemented without a back channel for carrying a feedback signal from the receiver to the transmitter 202 for controlling the FFE. The channel 204 may be connected to a positive terminal ("RXP" in FIG. 2) and a negative terminal ("RXN" in FIG. 2) of the receiver ("RX" in FIG. 2).

It should be noted that the blocks at the receiver side of the block diagram of FIG. 2 (to the right of the dashed line 203 between the channel 204 and front-end comparators) are a purely schematic representation of selected hardware features of the receiver that may be involved in performing a method of operating a wireline receiver. In particular, said representation may be incomplete, i.e., the receiver may include various and numerous further blocks that are not depicted in FIG. 2 and may represent functions and/or devices of the receiver that may be required for operating the receiver, but may have no immediate effect on the performance of the method of operating a wireline receiver.

The input signal may be distributed to one or more front-end comparators of the receiver. Without limitation, the receiver of FIG. 2 may include four front-end comparators that may be operated at quarter rate (i.e., one fourth of the frequency) of a full-rate clock signal available onboard the receiver. The example of FIG. 2 shows four quarter-rate sub-signals CK0, CK90, CK180 and CK 270 that are shifted in phase by 90 degrees against each other, where each sub-signal is fed to a clock input of one of the front-end comparators. Without limitation, each front-end comparator may include a first stage 206 and a second stage 208 which, in the example of FIG. 2, are depicted, respectively, as an integrating amplifier and a latch adapted for regenerating and holding the output of the integrating amplifier.

The outputs of the front-end comparators may be forwarded, together with one or more of the clock sub-signals, to a deserializer 210, which may be a 4:32 deserializer in the example of FIG. 2. The deserializer 210 may convert information content from its respective input channel(s) into multiple time-parallel signals and may subdivide the clock signal(s) according to the ratio of input to output channels. In the example of FIG. 2, each of the four input channels is deserialized into e.g. eight output channels by adding different delays for each output channel, yielding a total of 32 output channels; the quarter-rate clock signal is split up into a thirty-second rate clock signal accordingly. It shall be noted that a deserializer 210 may be unnecessary in setups where no serialization is implemented at the transmitter 202.

The deserialized output and the split clock signal may then be forwarded to a feedback controller 212, which is a digital block in the example of FIG. 2. The feedback controller 212 may be aware of deviations of the deserialized signal from the predefined processing criterion, wherein the predefinition of the processing criterion may be achieved by construction or programming, for instance. The feedback controller 212 may obtain (generate, select) a control signal adapted for controlling the timing characteristic of the front-end comparator. For this reason, the feedback controller 212 may include a control output for distributing the control signal to the front-end comparator.

In the example of FIG. 2, the front-end comparator is optionally enhanced by a capacitive digital-to-analog converter (CDAC) 214. The CDAC 214 may receive the control signal from the feedback controller 212 and respond to the control signal by adapting the switching states of its digitally controllable switches. The CDAC 214 may be electrically connected to the front-end comparators, particularly to the first stage 206 in the example of FIG. 2. In this way, the capacitance of the CDAC 214 may be controlled and may thus influence electrical properties of the front-end comparator such as its impulse sensitivity function (ISF). In an alternative example, the control signal may be directly distributed to a control input of each front-end comparator, which may be part of the respective first stage 206. In another example, the digital block is adapted for outputting a 5-bit control signal and the CDAC 214 may include 32 separately switchable capacitances, reflecting the 5-bit resolution of the feedback controller 212.

Figure 3:
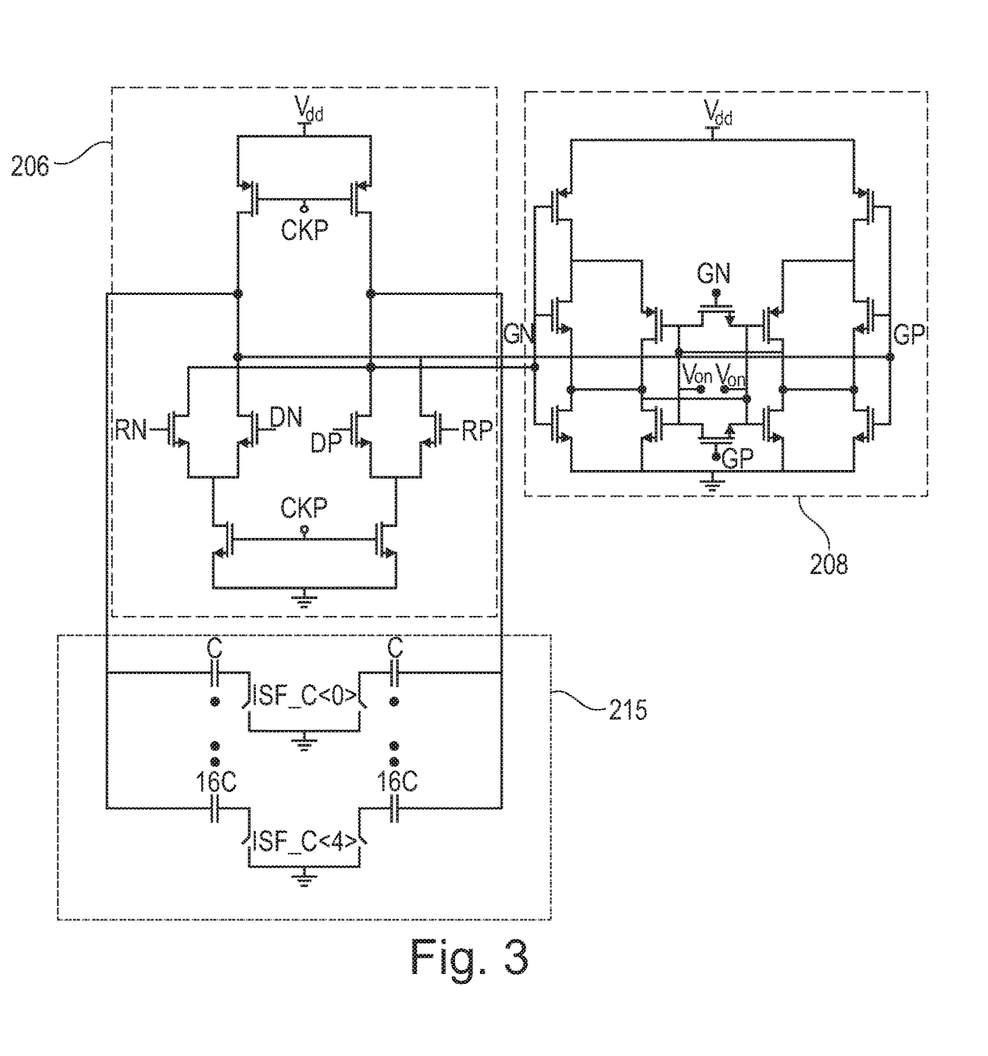
FIG. 3 is a circuit diagram of a front-end comparator with a tunable capacitance.

FIG. 3 is a circuit diagram of an exemplary front-end comparator including the first stage 206, the second stage 208, and a tunable capacitor 215. The exemplary first stage 206 shown in FIG. 3 may include an integrating amplifier. The first stage 206 may include a tap connecting the first stage 206 with the second stage 208, and another tap connecting the same line of the first stage 206 with the tunable capacitor 215. In the example of FIG. 3, the second stage 208 may implement a latch adapted for regenerating and holding the symbol signal output by the first stage 206, and the tunable capacitor 215 may implement the CDAC 214 of FIG. 2. In the example of FIG. 3, the CDAC 214 may be equipped with, for example, 32 independently switchable capacitors so that a total of 32 capacitances can be switched in parallel to the first stage 206.

Figure 4:
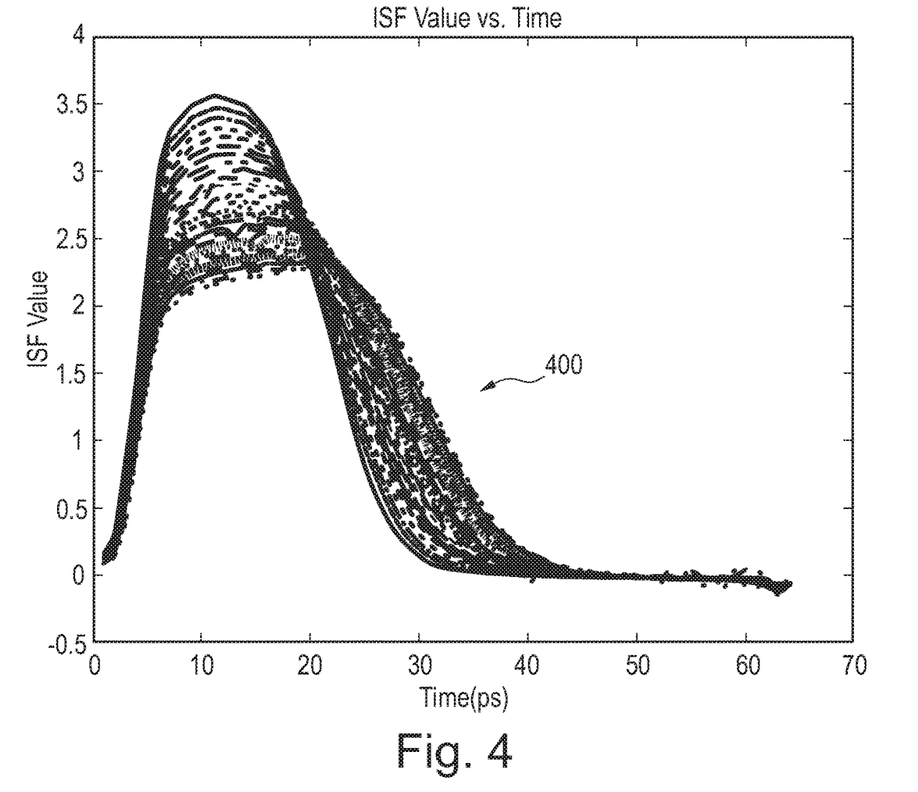
FIG. 4 is a plot of a series of curves representing a tunable impulse sensitivity function.

FIG. 4 is a plot of a series of 32 simulated curves 400 representing a tunable impulse sensitivity function (ISF) of a front-end comparator that has been tuned using a 5-bit digital control signal. Without limitation, the curves 400 may reflect different settings of a tunable capacitance as it may be realized using, for example, a capacitive digital-to-analog converter (CDAC), such as the CDAC 214 described above. The x axis shows a time coordinate in picoseconds (ps) wherein each curve 400 is shown on a time interval of 64 ps with a resolution of 1 ps. The y axis shows a coordinate representing the values assumed by the respective ISF. Each curve 400 exhibits a steep rise from zero in about the first 7 ps, followed by an approximately constant region and a slower slope downward back to about zero. Within the tuning range of the 5-bit control signal, the peaks of the IFS curves 400 range between high and narrow signal apertures (maximum at about 3.5 and return to zero at about 30 ps) and wider signal apertures with a less pronounced peak (maximum at about 2.25 and return to zero at about 45 ps). This may show that the total time of integration may be tuned at the expense of sensitivity. This effect may be equivalent to a deformation of the input signal arriving at a front-end comparator having an ideal, constant signal aperture. Hence, the resulting symbol signal output by the front-end comparator may correspond to a virtually deformed input signal. The simulation results may be interpreted as proof that a capacitive control method may be effective in modifying the ISF of a front-end comparator.

Figure 5:
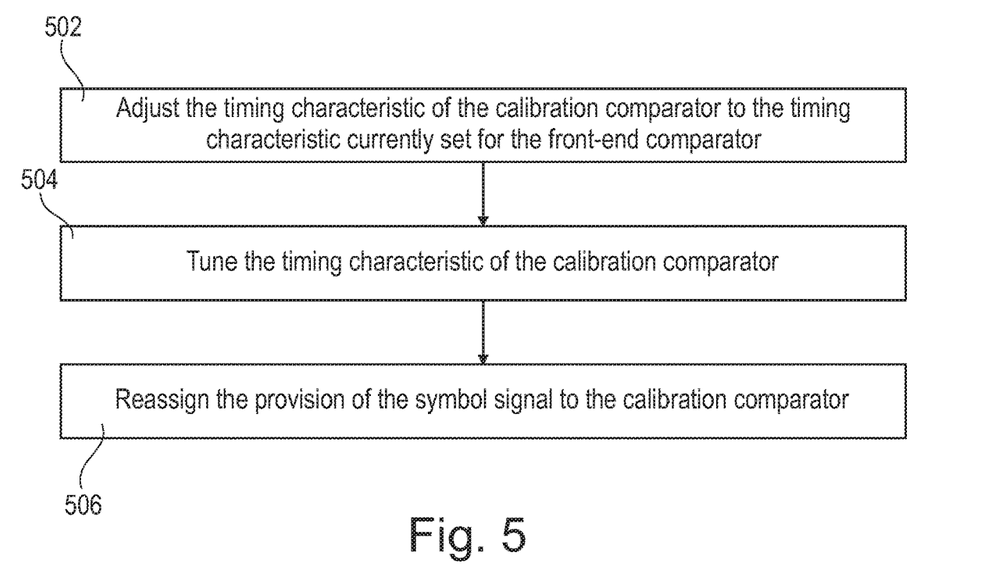
FIG. 5 is a flow diagram representing steps for calibrating a front-end comparator.

FIG. 5 is a flow diagram representing exemplary steps for calibrating an exemplary front-end comparator having a tunable timing characteristic. In the non-limiting example of FIG. 5, a wireline receiver hosting a front-end capacitor to be calibrated may include an additional calibration comparator that may operate in parallel with the regular front-end capacitor(s) of the receiver, but may not contribute its symbol signal output to downstream processing. Some or all of the calibrating steps may be performed e.g. by the feedback controller. The calibration may be triggered, for example, regularly or on an event-based scheme such as a mismatch between the observed symbol signal and the processing criterion monitored by the feedback controller.

In step 502, the calibration comparator may be initialized to the current state of the tunable timing characteristic of the front-end comparator. It may be assumed that the redundant symbol signal output by the calibration comparator equals the symbol signal of the front-end comparator contributing to downstream processing sufficiently well. The feedback controller may observe the redundant symbol signal in order to monitor the processing criterion. If a deviation from the processing criterion is observed, the feedback controller may tune 504 the timing characteristic of the calibration comparator to a new setting that may fulfil the processing criterion better. The feedback controller may then conclude the adaptation of the processing by reassigning 506 the provision of the symbol signal to the calibration comparator. As a result, the symbol signal generated by the newly tuned calibration comparator may be used for downstream processing of the symbol signal and the front-end controller that previously provided its symbol signal to downstream processing may now be used as a new calibration comparator and may be tuned, starting a new calibration cycle, to the timing characteristic of the reassigned comparator or any other front-end comparator that may be present.

Figure 6:
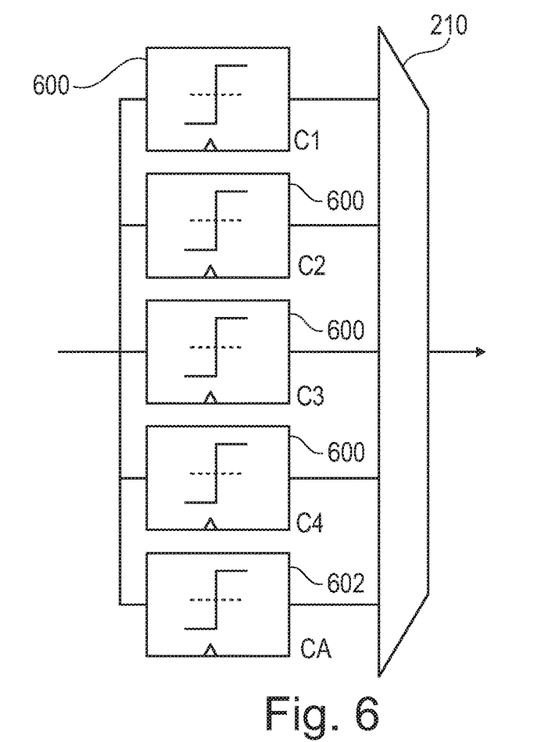
FIG. 6 is a block diagram illustrating a setup of front-end comparators augmented by a calibration comparator.

FIG. 6 is a block diagram illustrating an exemplary setup of e.g. four front-end comparators 600 labeled C1 through C4 augmented by a calibration comparator 602 labeled CA. The outputs of the front-end comparators 600, 602 are handed over to e.g. a deserializer 210. Without limitation, the four front-end comparators 600 may represent the case of a quarter-rate receiver where calibration may be performed using e.g. a capacitive digital-to-analog converter (CDAC). The calibration comparator 602 may be calibrated e.g. during operation. The output of the calibration comparator 602 may be observed by using e.g. an additional multiplexer (not shown). Then the activation state of the calibration comparator may be swapped e.g. back and forth, e.g., in the digital domain with one of the main e.g. quarter-rate front-end comparators C1 . . . C4 after which another calibration cycle may be run.

An alternative approach of calibrating the front-end comparators may refrain from performing a back switch after calibration. Instead, it may be possible to make the device controlling the swapping of the front-end comparators (e.g., the feedback controller) store an identifier for the one out of five (in the non-limiting example of FIG. 6) front-end comparators 600, 602 that is currently idle, and if a calibration is to be performed, the idle front-end comparator may be tuned directly to the updated tuning setting and its activation state may then be swapped only once with the front-end comparator that was to be tuned originally. The latter front-end comparator may then stay idle until for example, the next calibration cycle is performed. This may enable a shorter calibration cycle and a more homogeneous distribution of workload across the five front-end comparators 600, 602.

Figure 7:
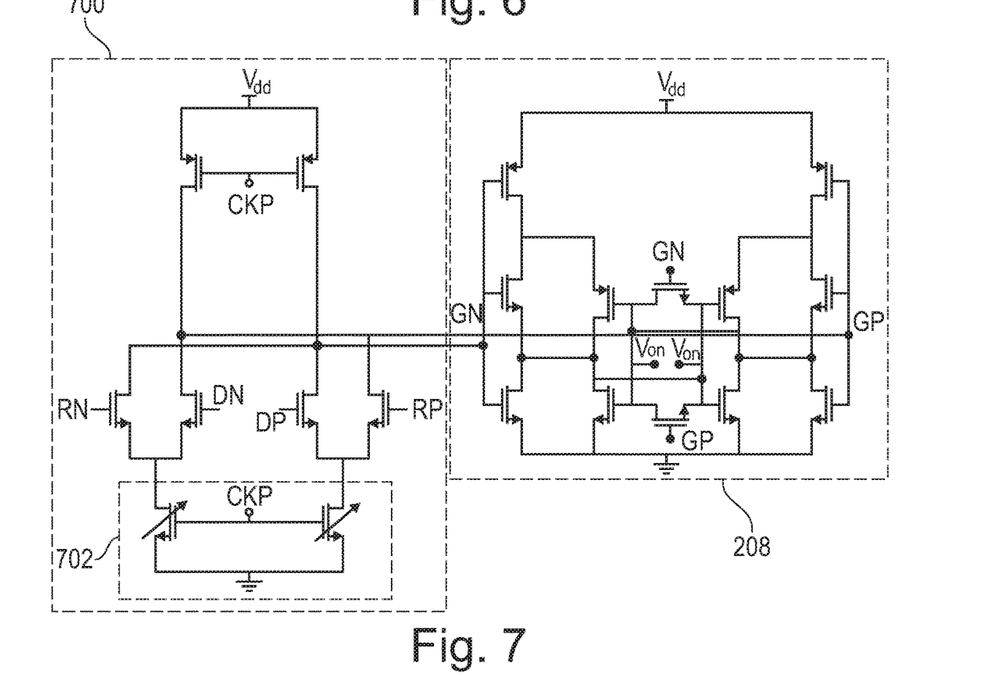
FIG. 7 is a circuit diagram of a front-end comparator including a first stage and a second stage.

FIG. 7 is a circuit diagram of an exemplary front-end comparator including a first stage 700 and a second stage 208. The exemplary first stage 700 shown in FIG. 7 may include an integrating amplifier 206. The first stage 700 may be connected to the second stage 208 by a tap. In the example of FIG. 7, the second stage 208 may implement a latch adapted for regenerating and holding the symbol signal output by the first stage 700. The first stage 700 may further include a tail current source 702. In the example shown in FIG. 7, the tail current source may include two n-channel metal-oxide-semiconductor field-effect transistors (NMOS FETs) with a tunable channel size. By tuning the NMOS channel size of one or both transistors using, e.g., a feedback signal generated by the feedback controller, the conductivity of the respective transistor, and thus, the amount of current provided by the tail current source 702 for integrating the input signal may be modulated. Hence, this may correspond to an adjustment of the impulse sensitivity function (ISF) of the front-end comparator.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of operating a wireline receiver, the receiver comprising a front-end comparator and a feedback controller, the method comprising:
    providing, by the front-end comparator, a symbol signal by processing a received electrical input signal according to a tunable timing characteristic of the front-end comparator; and
    adapting, by the feedback controller, the processing of the input signal to match a predetermined processing criterion by tuning the timing characteristic based on the symbol signal, wherein the timing characteristic comprises an impulse sensitivity function of the front-end comparator, the processing criterion comprises a desired shape of the input signal, the adaptation of the processing comprises emulating a deformation of the input signal to match the desired shape by adjusting the impulse sensitivity function.

2. The method of claim 1, wherein the front-end comparator comprises an integrating amplifier stage and a tunable capacitance electrically connected in parallel with an output of the integrating amplifier stage, the adjustment of the impulse sensitivity function comprises setting the tunable capacitance; and
    the front-end comparator comprises the integrating amplifier stage, the integrating amplifier stage comprises a tail current source comprising a field-effect transistor having a tunable channel size, the adjustment of the impulse sensitivity function comprises setting the tunable channel size.

3. The method of claim 1, wherein receiving the electrical input signal comprises:
    recording a main cursor of the input signal and recording a first post-cursor of the input signal immediately after recording the main cursor, the desired shape requiring that an amplitude of the first post-cursor is one half times an amplitude of the main cursor.

4. The method of claim 3, further comprising:
    performing an initial calibration of the front-end comparator, the initial calibration comprising, by the front-end comparator, repeatedly receiving a calibration input signal encoding a predetermined calibration symbol;
    determining, by the feedback controller, a transition timing characteristic by varying a timing characteristic for each repetition of the calibration input signal until a symbol signal of a given repetition differs from a symbol signal of the repetition immediately preceding the given repetition; and setting, by the feedback controller, the timing characteristic to the transition timing characteristic.

5. The method of claim 1, wherein the timing characteristic comprises a sampling time of the front-end comparator, the processing criterion comprises a desired phase accuracy, the adaptation of the processing comprises adjusting the sampling time to match the desired phase accuracy.

6. The method of claim 1, wherein the timing characteristic comprises the impulse sensitivity function of the front-end comparator, the processing criterion comprises a desired phase accuracy, the adaptation of the processing comprises repositioning a transition level of the front-end comparator for deciding between two bit values of the symbol signal to match the desired phase accuracy by adjusting the impulse sensitivity function.

7. The method of claim 1, wherein the receiver further comprises:
a calibration comparator having the tunable timing characteristic, the method further comprising adjusting, by the feedback controller, the timing characteristic of the calibration comparator to the timing characteristic currently set for the front-end comparator, the tuning of the timing characteristic being performed with the calibration comparator, the adaptation of the processing further comprises reassigning a provision of the symbol signal to the calibration comparator.

8. The method of claim 1, further comprising:
filtering a predetermined filter symbol from the symbol signal and counting a frequency of a predetermined counting symbol either preceding or following the filter symbol, the processing criterion comprises a tolerance interval for the frequency, the adaptation of the processing being triggered if the frequency is outside the tolerance interval.

9. The method of claim 1, wherein the input signal carries a four-level pulse-amplitude modulation.

10. A wireline receiver comprising a front-end comparator and a feedback controller, the front-end comparator is configured to provide a symbol signal by processing a received electrical input signal according to a tunable timing characteristic of the front-end comparator, the feedback controller is configured to adapt the processing of the input signal to match a predetermined processing criterion by tuning the timing characteristic based on the symbol signal, wherein the timing characteristic comprises an impulse sensitivity function of the front-end comparator, the processing criterion comprises a desired shape of the input signal, the adaptation of the processing comprises emulating a deformation of the input signal to match the desired shape by adjusting the impulse sensitivity function.

11. The receiver of claim 10, wherein the front-end comparator comprises a first stage and a tunable capacitance electrically connected in parallel with an output of the first stage, the feedback controller is configured to perform the tuning of the timing characteristic by setting the tunable capacitance; and
the front-end comparator comprising the first stage, the first stage comprises a tail current source, the tail current source comprises a field-effect transistor having a tunable channel size, the feedback controller is configured to perform the tuning of the timing characteristic by setting the tunable channel size.

12. The receiver of claim 11, wherein the tunable capacitance comprises a capacitive digital-to-analog converter.

13. The receiver of claim 11, wherein the first stage comprises an integrating amplifier.

14. The receiver of claim 10, further comprising:
a calibration comparator having a tunable timing characteristic, the feedback controller is further configured to adjust the timing characteristic of the calibration comparator to the timing characteristic currently set for the front-end comparator, the feedback controller is further configured to perform the tuning of the timing characteristic with the calibration comparator and for including in the adaptation of the processing a reassignment of a provision of the symbol signal to the calibration comparator.

15. The receiver of claim 10, wherein the feedback controller comprises a digital block.

16. The receiver of claim 10, further comprising a deserializer electrically connected in series between the front-end comparator and a feedback equalizer.

17. The receiver of claim 10, wherein the receiver is configured for providing the symbol signal in response to receiving the input signal carrying a four-level pulse-amplitude modulation.

18. The receiver of claim 10, wherein the front-end comparator is clocked at a rate of less than a full clock rate available in the receiver.

19. A computer program product for operating a wireline receiver, the receiver comprising a front-end comparator and a feedback controller, the computer program product comprising:
a computer-readable storage medium having program instructions embodied therewith, the program instructions executable by a computer to cause the computer to perform a method, comprising:
providing, by the front-end comparator, a symbol signal by processing a received electrical input signal according to a tunable timing characteristic of the front-end comparator; and
adapting, by the feedback controller, the processing of the input signal to match a predetermined processing criterion by tuning the timing characteristic based on the symbol signal, wherein the timing characteristic comprises an impulse sensitivity function of the front-end comparator, the processing criterion comprises a desired shape of the input signal, the adaptation of the processing comprises emulating a deformation of the input signal to match the desired shape by adjusting the impulse sensitivity function.

20. A computer program product of claim 19, wherein the front-end comparator comprises an integrating amplifier stage and a tunable capacitance electrically connected in parallel with an output of the integrating amplifier stage, the adjustment of the impulse sensitivity function comprises setting the tunable capacitance; and
the front-end comparator comprises the integrating amplifier stage, the integrating amplifier stage comprises a tail current source comprising a field-effect transistor having a tunable channel size, the adjustment of the impulse sensitivity function comprises setting the tunable channel size.

* * * * *